United States Patent
MacLennan et al.

(10) Patent No.: US 7,973,632 B2
(45) Date of Patent: Jul. 5, 2011

(54) METHODS AND APPARATUS FOR ELECTROMAGNETIC COMPONENT

(75) Inventors: Grant MacLennan, Scottsdale, AZ (US); Benjamin Richie, Scottsdale, AZ (US)

(73) Assignee: CTM Magnetics, Inc, Tempe, AZ (US)

( * ) Notice: Subject to any disclaimer, the term of this patent is extended or adjusted under 35 U.S.C. 154(b) by 131 days.

(21) Appl. No.: 12/434,894

(22) Filed: May 4, 2009

(65) Prior Publication Data

US 2009/0267720 A1     Oct. 29, 2009

Related U.S. Application Data (63) Continuation-in-part of application No. 12/206,584, filed on Sep. 8, 2008, now Pat. No. 7,855,629, which is a continuation of application No. 11/156,080, filed on Jun. 17, 2005, now Pat. No. 7,471,181, application No. 12/434,894, which is a continuation-in-part of application No. 12/197,034, filed on Aug. 22, 2008.

(60) Provisional application No. 60/580,922, filed on Jun. 17, 2004, provisional application No. 60/957,371, filed on Aug. 22, 2007, provisional application No. 61/050,084, filed on May 2, 2008.

(51) Int. Cl.
*H01F 5/00* (2006.01)

(52) U.S. Cl. ........................................................ 336/200
(58) Field of Classification Search ............... 336/55–62, 336/65, 200, 210, 225–229; 361/271, 600; 363/65
See application file for complete search history.

(56) References Cited

U.S. PATENT DOCUMENTS

| | | | |
|---|---|---|---|
| 3,374,452 A | 3/1968 | Judd | |
| 3,377,582 A | 4/1968 | Rogers | |
| 3,668,589 A | 6/1972 | Wilkinson | |
| 4,393,435 A | 7/1983 | Petrina | |
| 4,547,713 A | 10/1985 | Langley et al. | |
| 4,639,626 A | 1/1987 | McGee | |
| 4,710,667 A | 12/1987 | Whiteley | |
| 5,444,229 A | 8/1995 | Rudolph et al. | |
| 5,543,674 A | 8/1996 | Koehler | |
| 5,543,773 A | 8/1996 | Evans et al. | |
| 5,868,123 A | 2/1999 | Hasegawa et al. | |
| 6,154,109 A | 11/2000 | Gold | |
| 6,166,472 A | 12/2000 | Pinkerton et al. | |
| 6,545,450 B1 * | 4/2003 | Ledenev et al. | 323/272 |
| 6,648,990 B2 | 11/2003 | Yoshizawa | |
| 6,897,718 B2 | 5/2005 | Yoshida et al. | |
| 2008/0024259 A1 * | 1/2008 | Chandrasekaran et al. | 336/178 |

* cited by examiner

*Primary Examiner* — Tuyen Nguyen
(74) *Attorney, Agent, or Firm* — The Noblitt Group PLLC (57) ABSTRACT

The invention comprises a power filtering method and apparatus.

19 Claims, 8 Drawing Sheets

METHODS AND APPARATUS FOR ELECTROMAGNETIC COMPONENT

CROSS-REFERENCE TO RELATED APPLICATIONS

This application is a continuation-in-part of U.S. patent application Ser. No. 12/206,584 filed Sep. 8, 2008, which is a continuation of U.S. patent application Ser. No. 11/156,080, filed on Jun. 17, 2005, which claims benefit of U.S. provisional patent application Ser. No. 60/580,922, filed on Jun. 17, 2004; and is a continuation-in-part of U.S. patent application Ser. No. 12/197,034 filed Aug. 22, 2008, which claims benefit of U.S. provisional patent application Ser. No. 60/957,371, filed on Aug. 22, 2007; and claims benefit of U.S. provisional patent application Ser. No. 61/050,084, filed May 2, 2008, all of which are incorporated herein in their entirety by this reference thereto.

FIELD OF INVENTION

The invention relates to power filtering methods and apparatus.

BACKGROUND OF INVENTION

Power is generated from a number of sources. The generated power is necessarily filtered with electromagnetic components before entering the power grid. In many industrial applications, electromagnetic components, such as inductors and capacitors, are used in power filtering. Important factors in the design of power filtering methods and apparatus include cost, size, efficiency, resonant points of filter and inductor, impedance or inductance at desired frequencies, and inductance capacity.

SUMMARY OF THE INVENTION

The invention comprises an electromagnetic component mounting and/or filtering method and apparatus for filtering power.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The invention comprises an electromagnetic component mounting and/or filtering method and apparatus for filtering power. More particularly, the invention relates to inductor and capacitor mounting and/or inductor and capacitor filtering methods and apparatus.

In one embodiment, a capacitor array mounting method and apparatus is provided.

In another embodiment, an inductor and capacitor array mounting method and apparatus is provided.

In yet another embodiment, an inductor and capacitor array filtering method and apparatus is provided.

Methods and apparatus according to various embodiments operate in conjunction with an inductor and/or a capacitor. For example, an inverter/converter system using at least one inductor and at least one capacitor optionally mounts the electromagnetic components in a vertical format, which reduces space and/or material requirements. In another example, the inductor comprises a substantially annular core and a winding. The inductor is preferably configured for high current applications, such as at or above about 50, 100, or 200 amperes. In yet another example, a capacitor array is preferably used in processing a provided power supply.

The invention is described partly in terms of functional components and various assembly and/or operating steps. Such functional components are optionally realized by any number of components configured to perform the specified functions and achieve the various results. For example, embodiments optionally use various elements, materials, coils, cores, filters, supplies, loads, passive and active components, which optionally carry out functions related to those described. In addition, the present invention is optionally practiced in conjunction with any number of applications, environments, and/or passive circuit elements. The systems and components described are merely exemplary applications for the invention. Further, the present invention optionally uses any number of conventional techniques for manufacturing, assembling, connecting, and/or operation.

An electrical system according to various aspects of the present invention includes an electromagnetic component operating in conjunction with an electric current to create a magnetic field, such as with a transformer, inductor, and/or capacitor array. In one embodiment, the electrical system comprises an inverter/converter system having a filter circuit, such as a low pass filter or a high pass filter. The power supply or inverter/converter comprises any suitable power supply or inverter/converter, such as an inverter for a variable speed drive, an adjustable speed drive, and/or an inverter/converter that provides power from an energy device like an electrical transmission line, generator, turbine, battery, flywheel, fuel cell, solar cell, wind turbine, biomass, or any other high frequency inverters or converters.

The electrical system described is optionally adaptable for any suitable application or environment, such as variable speed drive systems, uninterruptible power supplies, backup power systems, inverters, and/or converters for renewable energy systems, hybrid energy vehicles, tractors, cranes, trucks and other machinery using fuel cells, batteries, hydrogen, wind, solar, biomass and other hybrid energy sources, regeneration drive systems for motors, motor testing regenerative systems, and other inverter and/or converter applications. Backup power systems may include, for example, superconducting magnets, batteries, and flywheel technology. Renewable energy systems optionally include any of: solar, fuel cell, wind turbine, hydrogen, biomass and natural gas turbines.

In various embodiments, the electrical system is adaptable for energy storage or generation systems using direct current (DC) or alternating current (AC) electricity configured to backup, store, and/or generate distributed power. Various embodiments are particularly suitable for high current applications, such as currents greater than about 100 amperes (A), for example currents greater than about 200 A, and more particularly currents greater than about 400 A, as well as to electrical systems exhibiting multiple combined signals, such as one or more pulse width modulated (PWM) higher frequency signals superimposed on a lower frequency waveform. For example, a switching element may generate a PWM ripple on a main supply waveform. Such electrical systems operating at currents greater than about 100 A operate within a field of art substantially different than low power electrical systems, such as those operating at sub-ampere levels or at about 2, 5, 10, 20, or 50 amperes.

Various embodiments are optionally adapted for high-current inverters and converters. An inverter produces alternating current from a direct current. A converter processes AC or DC power to provide a different electrical waveform. The term converter denotes a mechanism for either processing AC power into DC power, which is a rectifier, or deriving power with an AC waveform from DC power, which is an inverter. An inverter/converter system is either an inverter system or a converter system. Converters are used for many applications, such as rectification from AC to supply electrochemical processes with large controlled levels of direct current, rectification of AC to DC followed by inversion to a controlled frequency of AC to supply variable-speed AC motors, interfacing DC power sources, such as fuel cells and photoelectric devices, to AC distribution systems, production of DC from AC power for subway and streetcar systems, for controlled DC voltage for speed-control of DC motors in numerous industrial applications, and transmission of DC electric power between rectifier stations and inverter stations within AC generation and transmission networks.

Figure 1:
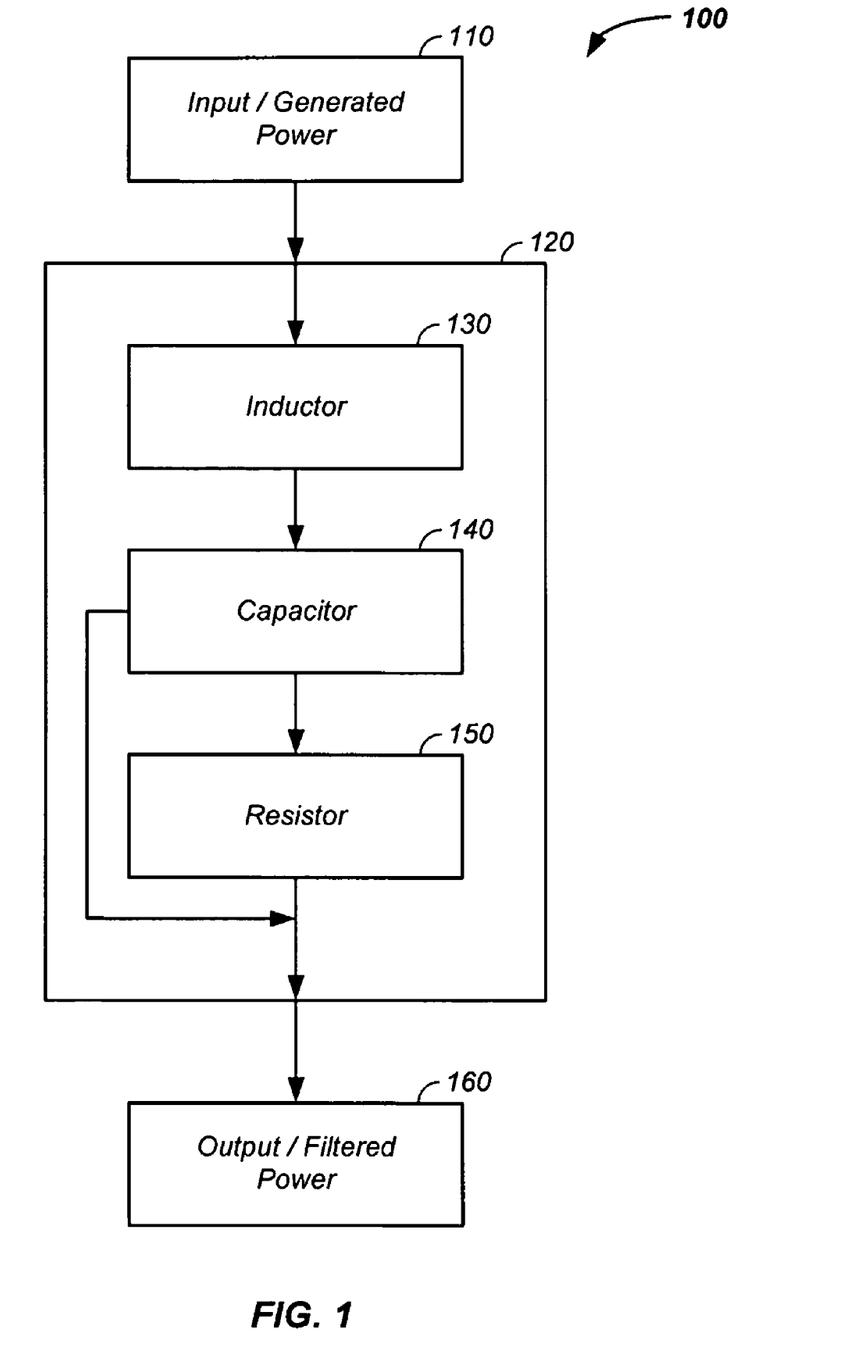
FIG. 1 illustrates a power filtering process.

Referring now to FIG. 1, in a filtering power process 100, an input power, provided power, or generated power 110 supply provides a high AC current to a load. The power supply system or input power includes any other appropriate elements or systems, such as a voltage or current source and a switching system or element. The supply optionally operates in conjunction with various forms of modulation, including pulse width modulation, resonant conversion, quasi-resonant conversion, phase modulation, or any other suitable form of modulation.

The input power 110 is processed with a power processing system 120 to produce an output power or filtered power supply 160. Filter circuits in a power processing system 120 are configured to filter selected components from the supply signal. The selected components comprise any elements to be attenuated or eliminated from the supply signal, such as noise and/or harmonic components, for example to reduce total harmonic distortion. In one embodiment, the filter circuits are configured to filter higher frequency harmonics over the fundamental frequency, which is typically DC, 50 Hz, 60 Hz, or 400 Hz, such as harmonics over about 300 or 500 or 600 or 800 or 1000 or 2000 Hz in the supply signal, such as harmonics induced by the operating switching frequency of insulated gate bipolar transistors (IGBTs) and/or any other electrically operated switches. The filter circuit optionally includes passive components, such as an inductor-capacitor filter comprised of an inductor 130, a capacitor 140, and in some embodiments a resistor 150. The values and configuration of the inductor 130 and the capacitor 140 are selected according to any suitable criteria, such as to configure the filter circuits to a selected cutoff frequency, which determines the frequencies of signal components filtered by the filter circuit. The inductor 130 is preferably configured to operate according to selected characteristics, such as in conjunction with high current without excessive heating or exceeding safety compliance temperature requirements. The latch comprises any system or method which can operate as a switch for a circuit, such as a transistor, a diode, a membrane switch, or any type of switching device.

Power Processing System

Figure 2:
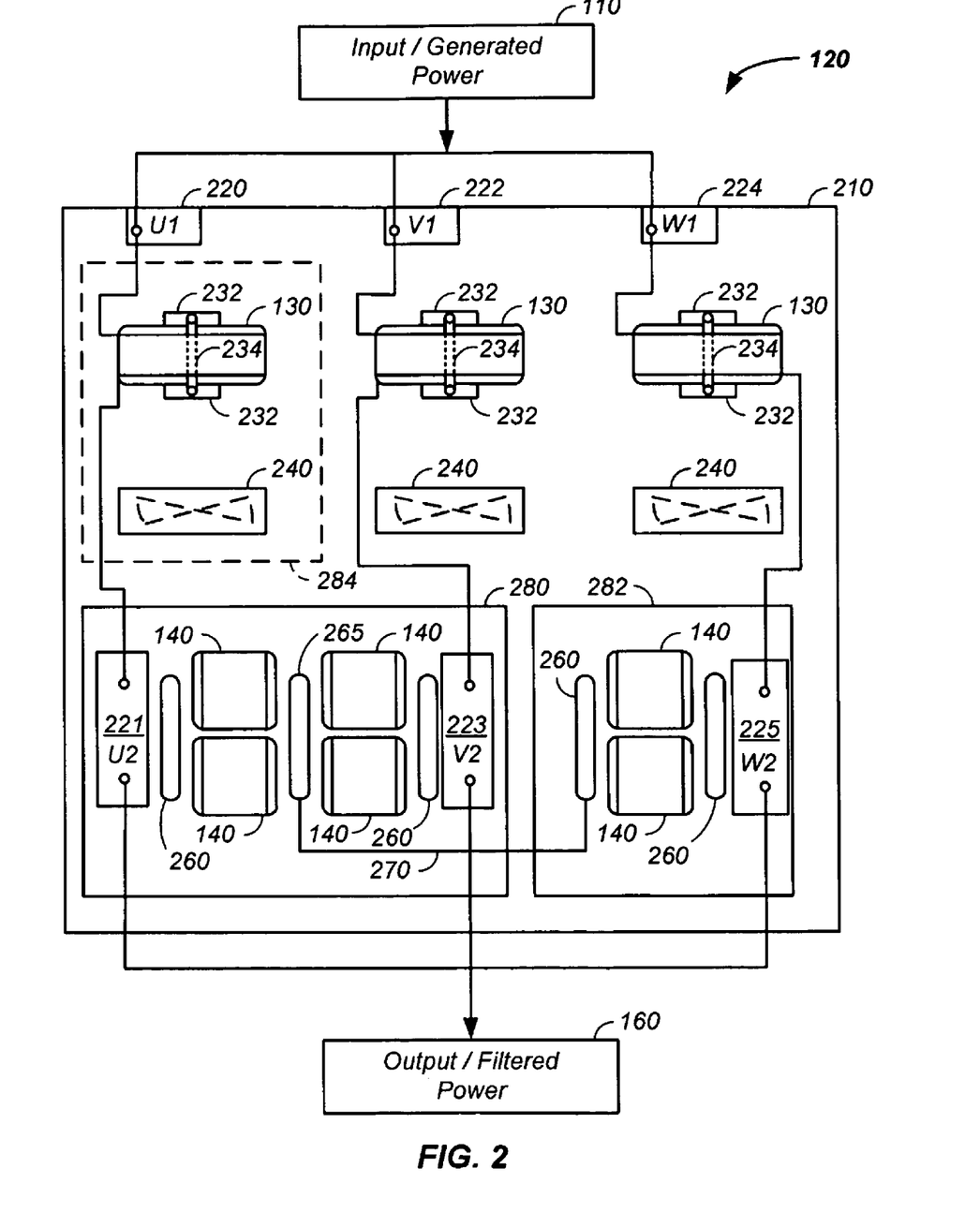
FIG. 2 illustrates multi-phase inductor/capacitor component mounting and filter circuit for power processing.

Referring now to FIG. 2, an illustrative example of multiphase power filtering is provided. Input power 110 is processed using the power processing system 120 to yield filtered and/or transformed output power 160. In this example, three-phase power is processed. The three phases of the three-phase input power are denoted U1, V1, and W1. The input power 110 is connected to a corresponding phase terminal U1 220, V1 222 and/or W1 224, where the phase terminals are connected to or integrated with the power processing system 120. Herein, processing of a single phase is described, which is illustrative of multi-phase power processing. The input power 110 is then processed by sequential use of an inductor 130 and a capacitor 140. The inductors 130 and capacitor 140 system is further described. After the inductor/capacitor processing, the three phases of processed power, corresponding to U1, V1, and W1 are denoted U2, V2, and W2, respectively, and are output as the processed and/or filtered power 160. Additional elements of the power processing system 120, in terms of the inductor 130, a cooling system 240, and mounting of the capacitors 140, are further described.

Isolators

Figure 3:
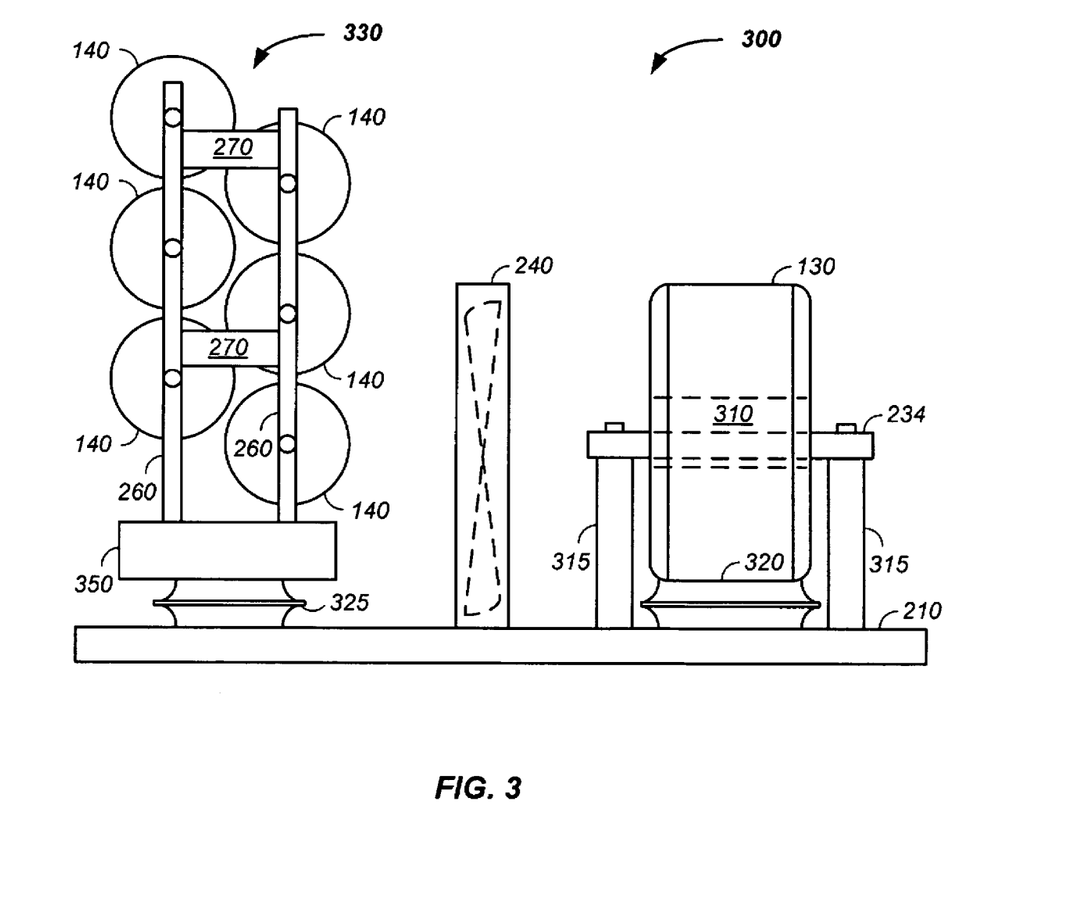
FIG. 3 further illustrates capacitor mounting.

Referring still to FIG. 2 and now to FIG. 3, in the power processing system 120, the inductor 130 is preferably mounted, directly or indirectly, to a base plate 210 via a mount 232, via an inductor isolator 320, and/or via a mounting plate 284. The inductor isolator 320 may attach the mount 232 indirectly to the base plate 210. The inductor 130 may additionally be mounted using a cross-member or clamp bar 234 running through a central opening 310 in the inductor 130. The capacitor 140 may be similarly mounted with a capacitor isolator 325 to the base plate 210. The isolators 320, 325 may comprise vibration, shock, and/or temperature isolators. In one embodiment, the isolators 320, 325 comprise a Glastic® (Rochling Glastic Composites, Ohio) material.

Cooling System

Figure 5:
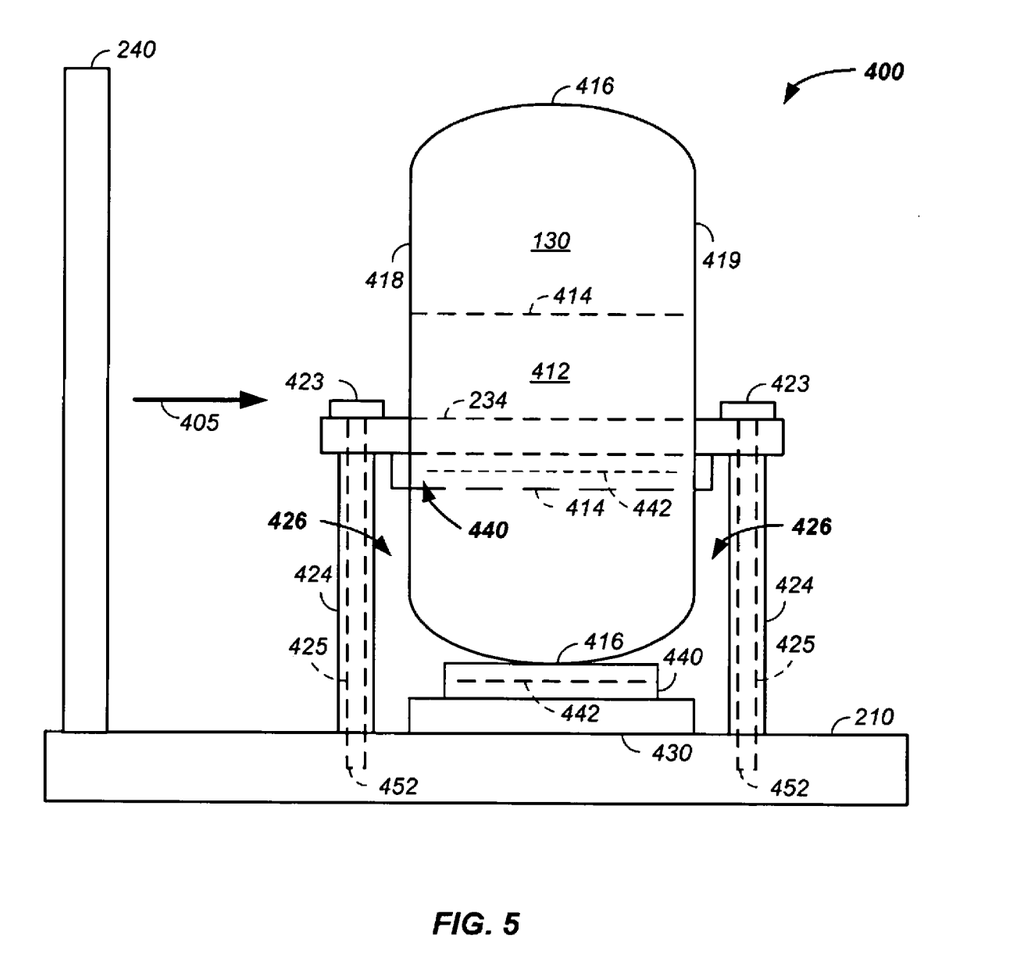
FIG. 5 illustrates a side view of an inductor.

Referring still to FIG. 2 and now to FIGS. 3 and 5, the power processing system 120 may include an optional cooling system 240. In the illustrated embodiment, the cooling system 240 comprises a fan to move air across the inductor 130. The fan may push and/or pull an air flow around and through the inductor 130. To achieve enhanced cooling, the inductor 130 may be mounted on an outer face 418 of the toroid using a vertical mounting system, such as via a clamp bar 234. Vertical mounting of the inductor 130 is further described, infra. Optional liquid based cooling systems 240 are further described, infra.

Bus Bars

Referring again to FIG. 2 and FIG. 3, in the power processing system 120, the capacitor 140 may comprise an array of capacitors parallel connected to achieve a specific capacitance for each of the multiple phases of the power supply 110. In FIG. 2, two capacitors 140 are illustrated for each of the multi-phased power supply U1, V1, and W1. The capacitors 140 are mounted using a series of bus bars 260. A bus bar 260 carries power from one point to another or connects one point to another.

Common Neutral Buss Bar Connects 2 Phases

A particular type of bus bar 260 is a common neutral bus bar 265. For example, a delta capacitor connection in a poly phase system may include a common neutral point for the capacitors 140. FIG. 2 details 2 phases where multiple capacitors 140 in parallel use a common neutral bus bar 265. The common neutral bus bar 265 acts as both a mount and a parallel bus conductor for two phases. This concept minimizes the number of parallel conductors, in a U shape in the present embodiment, to the number of phases plus 2. In a standard parallel bus bar scheme, the bus bars used is the number of phases multiplied by 2 parallel bus bars for each side of the capacitors 140 or number of phases times two. Minimizing the number of bus bars required to make a poly phase capacitor assembly where multiple smaller capacitors 140 are paralleled to create a larger capacitance minimizes the volume of space needed and the volume of bus bar conductors; all of which minimize cost of the capacitor assembly 330. After the 2 phases that share a common neutral bus conductor 265 are assembled; a simple jumper bus conductor may jumper those two phases to any quantity of additional phases as shown in FIG. 2. This jumper can have a few as 2 connection points and can also act as a handle on the capacitor assembly 330 for handling. It is also typical that this common neutral bus conductor 265 is the same shape as the other parallel bus conductors 260 throughout the capacitor assembly 330. This common shape theme, a U shape in the present embodiment, allows for symmetry of the assembly in a poly phase structure as shown in FIG. 2.

Parallel Buss Bars Act as Mounting Chassis

The bus bars 260, 265 may mechanically support the capacitors 140. The use of the bus bars 260, 265 for mechanical support of the capacitors 140 has several benefits. The parallel conducting bus bar 260 connecting multiple smaller value capacitors to create a larger value, which can be used in a U shape, may also operate as a mounting chassis. Incorporating the bus bar as a mounting chassis removes the requirement of the capacitor 140 to have separate, isolated mounting brackets. These brackets typically would mount to a ground point or metal chassis in a filter system. In the present embodiment, the capacitor terminals 140 and the parallel bus bar 260 support the capacitors 140 and eliminate the need for expensive mounting brackets and additional mounting hardware for these brackets. This mounting concept allows for optimal vertical or horizontal packaging in capacitors 140.

Parallel Buss Bar Carries Much Smaller Currents than Input/Output Terminal

The size of the bus bar 260 is minimized due to its handling of only the capacitor current and not the total line current, where the capacitor current is less than about 10, 20, 30, or 40% of the total line current. The parallel conducting bus bar 260, which also acts as the mounting chassis in the present embodiment, does not have to conduct full line current of the filter and can be substantially reduced in cross section when compared to the output terminal 350. This smaller sized bus bar 260 reduces the cost of the conductors required for the parallel configuration of the capacitors 140 by reducing the conductor volume of material. The full line current that is connected from the inductor 130 to the terminal 350 is substantially larger than the current that travels through the capacitors 140. It is less than about 10, 20, 30, or 40% of the full line current. In addition, when an inductor 130 is used that impedes the higher frequencies about 20, 100, 200, 500, 1000, 1500, or 2000 KHz before they reach the capacitor bus bar and capacitors 140, this parallel capacitor current is lower still than when an inferior filter inductor, whose resonant frequency is below 5, 10, 20, 40, 50, 75, 100 KHz, is used which cannot impede the higher frequencies due to its high internal capacitive construction (low resonant frequency). In cases where there are high frequency harmonics present and the inferior filter inductor is unable to impede these high frequencies; the capacitors must absorb and filter these currents which causes them to operate at higher temperatures, decreasing their usable life in the circuit. In addition, these un-impeded frequencies add to the necessary volume requirement of the capacitor bus bar and mounting chassis, which increases its cost.

Staggered Capacitor Mounting on Conductor Minimizes Volume

Capacitors

Figure 8:
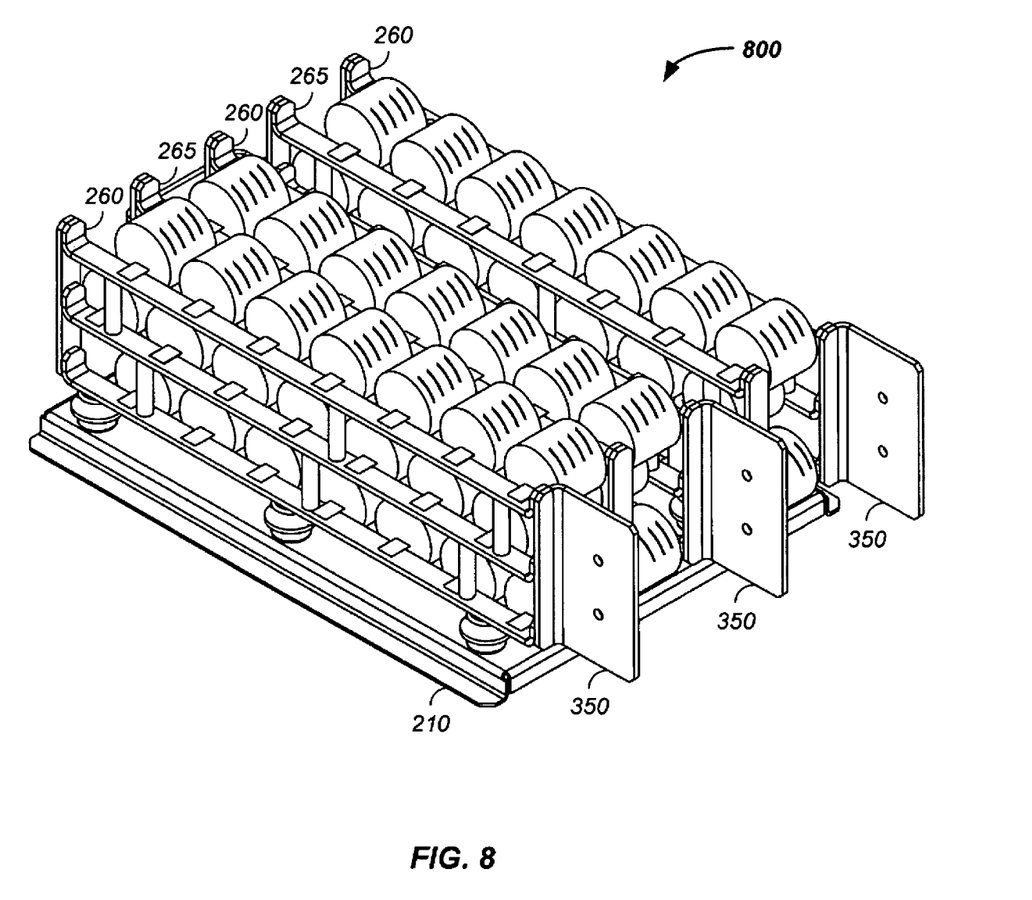
FIG. 8 illustrates a capacitor array.

Referring now to FIG. 3, a filter system 300 is illustrated. The filter system 300 preferably includes a mounting or base plate 210. The mounting 210 attaches to the inductor 130 and a set of capacitors 330. The capacitors 140 are preferably staggered in a close packed arrangement having a spacing between rows and staggered columns of about 0.25, 0.5, or 1 inch. The staggered packaging concept allows optimum packaging of multiple smaller value capacitors 140 in parallel creating a larger capacitance in a small, efficient space. Bus bars 260 can be utilized in a U shape to optimize packaging size for a required capacitance value. The U shape with staggered capacitors 140 can be mounted vertically to the mounting surface 210, as shown in FIG. 3 or horizontally to the mounting surface 210 as shown in FIG. 8. The U shape bus bar can have a mechanical stabilizing spacer, 270, at selected locations to mechanically stabilize both sides of the U shape bus bar as it extends from the terminal 350 as shown in FIGS. 3 and 8.

In this example, the capacitor bus bar 260 is in a 'U' shape that fastens to a terminal 350 attached to the base plate 210 via an insulator 325. The 'U' shape is formed by a first bus bar 260 joined to a second bus bar 260 via the terminal 350. The 'U' shape is alternatively shaped to maintain the staggered spacing, such as with m by n array of capacitors 140, where m and n are integers. The bus bar 260 contains neutral points 265 that are preferably shared between two phases of a poly-phase system. The neutral bus bars 265 connect to all three-phases via the jumper 270. The shared bus bar 265 allows the poly-phase system to have x+2 bus bars where x is the number of phases in the poly-phase system instead of traditional two bus bars per phase in a regular system. Optionally, the common bus bar 265 comprises a metal thickness of approximately twice the size of the bus bar 260. The staggered spacing enhances packaging efficiency by allowing a maximum number of capacitors 140 in a given volume while maintaining a minimal distance between capacitors 140 needed for the optional cooling system 240, such as cooling fans. The distance from the mounting surface 210 to the bottom or closest point on the body of the second closest capacitor 140 is less than the distance from the mounting surface 210 to the top or furthest point on the body of the closest capacitor 140. This mounting scheme is designated as a staggered mounting scheme for parallel connected capacitors 140 in a single or poly phase filter system.

Module Mounting

In the power processing system 120, module components are optionally used. For example, a first mounting plate 280 is illustrated that mounts three bus bars 260 and two arrays of capacitors 140 to the base plate 210. A second mounting plate 282 is illustrated that mount a pair of bus bars 260 and a set of capacitors 330 to the base plate 210. A third mounting plate 284 is illustrated that vertically mounts an inductor 130 and optionally an associated cooling system 240 or fan to the base plate 210. Generally, one or more mounting plates are used to mount any combination of inductor 130, capacitor 140, bus bar 260, and/or cooling system 240 to the base plate 210.

Referring now to FIG. 3, an additional side view example of a power processing system 120 is illustrated. FIG. 3 further illustrates a vertical mounting system 300 for the inductor 130 and/or capacitor 140. For clarity, the example illustrated in FIG. 3 shows only a single phase of a multi-phase power filtering system. Additionally, wiring elements are removed in FIG. 3 for clarity. Additional inductor 130 and capacitor 140 detail is provided, infra.

Inductor

Further embodiments of the inductor 130 are further described herein. Particularly, in a first section, vertical mounting of an inductor 130 is described. In a second section, inductor 130 elements are described.

Vertical Inductor Mounting

FIG. 3 illustrates indirect vertical mounting system of the inductor 130 to the base plate 210 with an optional intermediate vibration, shock, and/or temperature isolator 320. The isolator 320 is preferably a Glastic® material, described infra. The inductor 130 is preferably an edge mounted inductor with a toroidal core, described infra.

Figure 6:
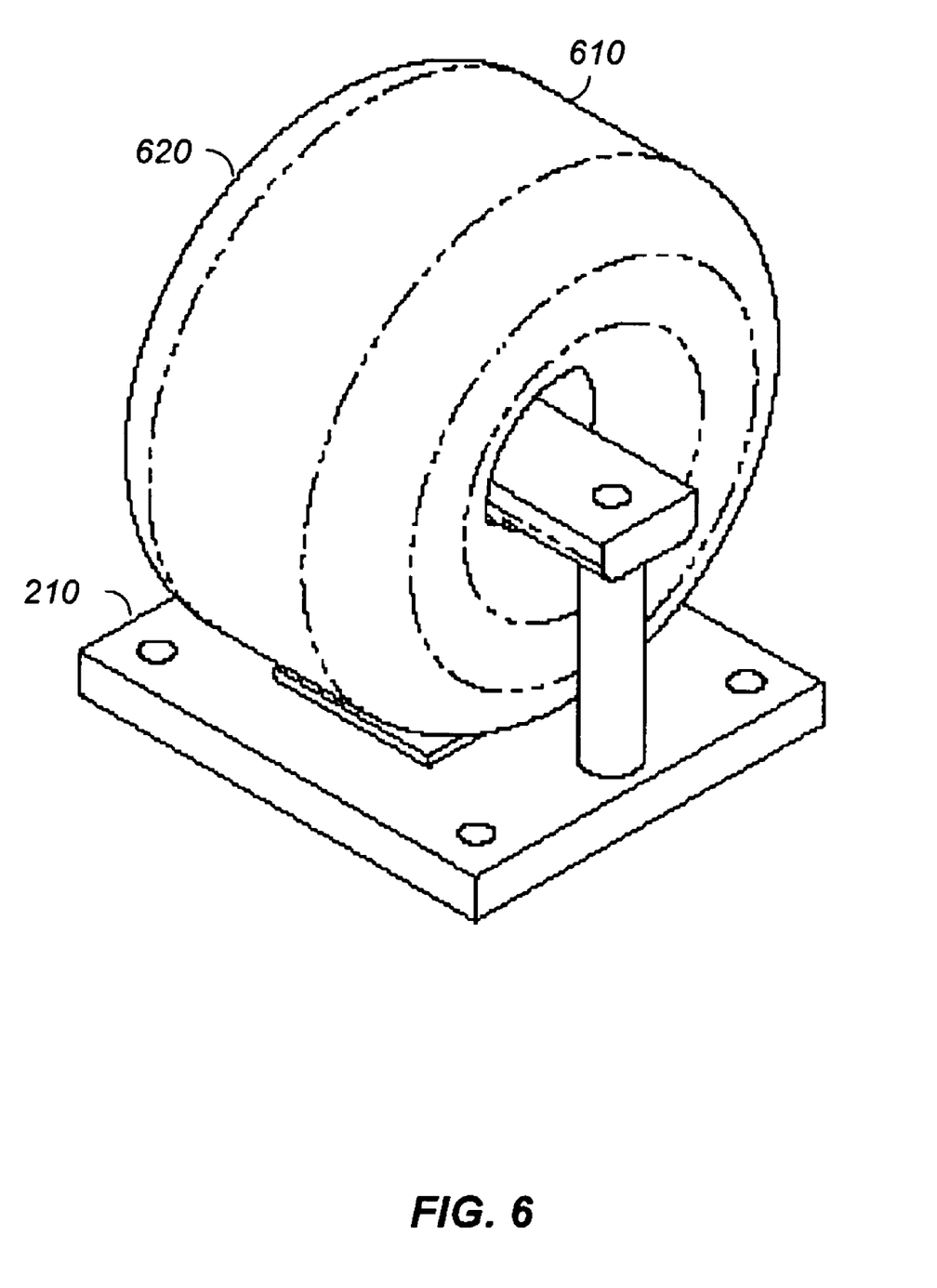
FIG. 6 illustrates an inductor core and an inductor winding.

Referring to FIG. 6, an inductor 130 according to various aspects of the present invention comprises a core 610 and a winding 620. The winding 620 is wrapped around core 610. The core 610 and winding 610 are suitably disposed on or in a mount and/or housing to support the core 610 in any suitable position and/or to conduct heat away from the core 610 and the winding 620. The inductor 130 may also include any additional elements or features, such as other items required in manufacturing.

In one embodiment, an inductor 130 or toroidal inductor is mounted on the inductor edge, is vibration isolated, and/or is optionally temperature controlled.

Figure 4:
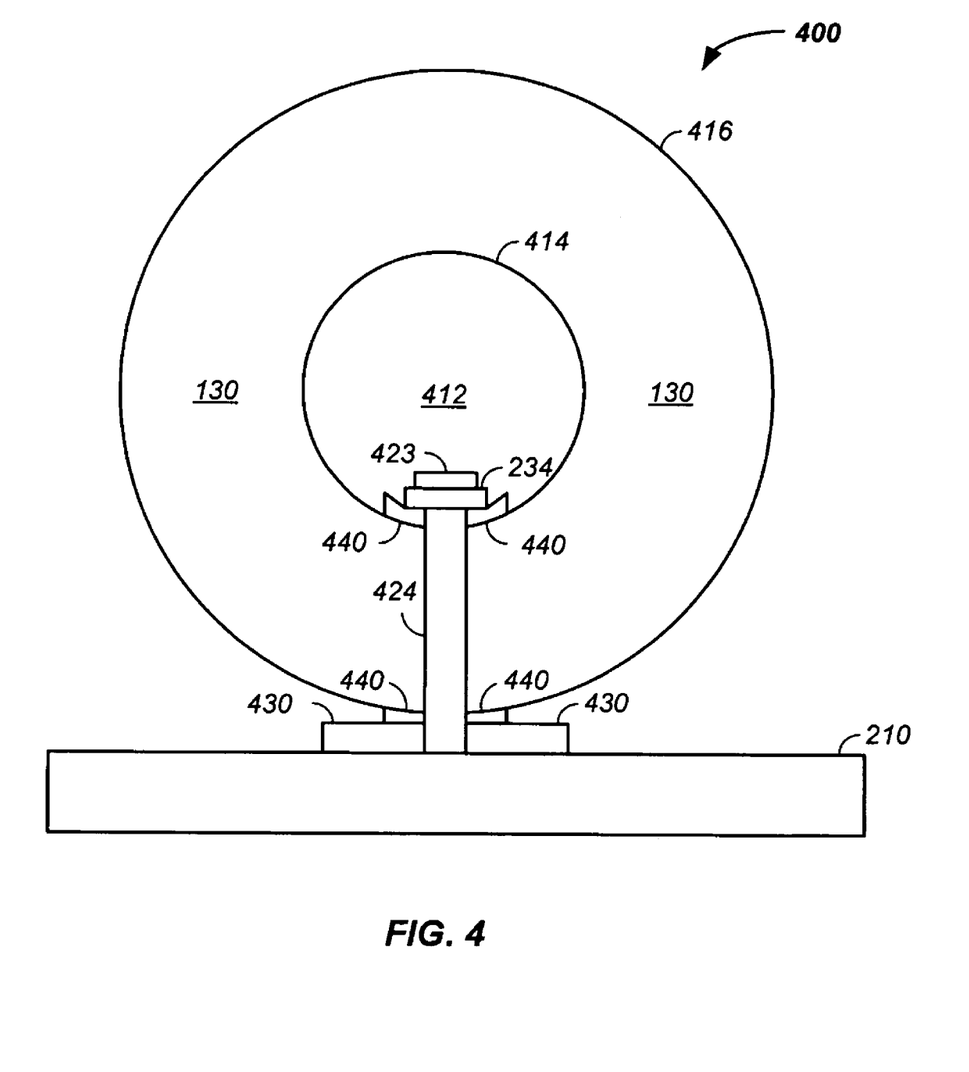
FIG. 4 illustrates a face view of an inductor.

Referring now to FIGS. 4 and 5, an example of an edge mounted inductor system 400 is illustrated. FIG. 4 illustrates an edge mounted toroidal inductor 130 from a face view. FIG. 5 illustrates the inductor 130 from an edge view. When looking through a center hole 412 of the inductor 130, the inductor 130 is viewed from its face. When looking at the inductor 130 along an axis-normal to an axis 405 running through the center hole 412 of the inductor 130, the inductor 130 is viewed from its edge. In an edge mounted inductor system 400, the edge of the inductor 130 is mounted to a surface 210. In a face mounted inductor system, the face of the inductor 130 is mounted to a surface 210. Elements of the edge mounted inductor system 400 are described, infra.

Referring still to FIGS. 4 and 5, the inductor 130 is mounted in a vertical orientation, where a center line through the center hole 412 of the inductor runs along an axis 405 that is about horizontal or parallel to a mounting surface 430 or base plate 210. The mounting surface 430 is optionally horizontal or vertical, such as parallel to a floor, parallel to a wall, or parallel to a mounting surface on a slope. In FIG. 4, the inductor 130 is illustrated in a vertical position relative to a horizontal mounting surface 430 with the axis 405 running parallel to a floor. While descriptions herein use a horizontal mounting surface to illustrate the components of the edge mounted inductor mounting system 400, the system is equally applicable to a vertical mounting surface. To further clarify, the edge mounted inductor system 400 described herein also applies to mounting the edge of the inductor 130 to a vertical mounting surface or an angled mounting surface. In these cases, the axis 405 still runs about parallel to the mounting surface 430, such as about parallel to the vertical mounting surface or about parallel to a sloped mounting surface 430, base plate 210, or other surface.

Still referring to FIGS. 4 and 5, the inductor 130 has an inner surface 414 surrounding the center hole 412, an outer edge 416 or outer edge surface, and two faces 417, 148, including a front face 418 and a back face 419. The surface of the inductor 130 includes: the inner surface 414, outer edge 416 or outer edge surface, and faces 418, 419. The surface of the inductor 130 is typically the outer surface of the magnet wire windings 620 surrounding the core 610 of the inductor 130. The magnet wire is preferably a wire with an aluminum oxide coating for minimal corona potential. The magnet wire is preferably temperature resistant or rated to at least 200 degrees Centigrade. The minimum weight of the inductor is about 2, 5, 10, or 20 pounds.

Still referring to FIGS. 4 and 5, an optional clamp bar 234 runs through the center hole 412 of the inductor 130. The clamp bar 234 is preferably a single piece, but is optionally composed of multiple elements. The clamp bar 234 is connected directly or indirectly to the mounting surface 430 and/or to a base plate 210. The clamp bar 234 is composed of a non-conductive material as metal running through the center hole 412 of the inductor 130 acts as a magnetic shorted turn in the system. The clamp bar 234 is preferably a rigid material or a semi-rigid material that bends slightly when clamped, bolted, or fastened to the mounting surface 430. The clamp bar 234 is preferably rated to a temperature of at least 130 degrees Centigrade. Preferably, the clamp bar material is a fiberglass material, such as a thermoset fiberglass-reinforced polyester material, that offers strength, excellent insulating electrical properties, dimensional stability, is flame resistance, is flexibility, and offers high property retention under heat. An example of a fiberglass clamp bar 234 material is Glastic®. Optionally the clamp bar 234 is a plastic, a fiber reinforced resin, a woven paper, an impregnated glass fiber, circuit board material, a high performance fiberglass composite, a phenolic material, a thermoplastic, a fiberglass reinforced plastic, a ceramic, or the like, which is preferably rated to at least 150 degrees Centigrade. Any of the mounting hardware is optionally made of these materials.

Still referring to FIGS. 4 and 5, the clamp bar 234 is preferably attached to the mounting surface 430 via mounting hardware. Examples of mounting hardware include: a bolt, a threaded bolt, a rod, a clamp bar 234, a mounting insulator 424, a connector, a metal connector, and/or a non-metallic connector. Preferably, the mounting hardware is non-conducting. If the mounting hardware is conductive, then the mounting hardware is preferably contained in or isolated from the inductor 130 via a mounting insulator 424. Preferably, an electrically insulating surface is present, such as on the mounting hardware. The electrically insulating surface proximately contacts the faces of the inductor 130. Alternatively, an insulating gap 426 of at least about one millimeter exists between the faces 418, 419 of the inductor 130 and the metallic or insulated mounting hardware, such as a bolt or rod.

An example of a mounting insulator 424 is a hollow rod where the outer surface of the hollow rod is non-conductive and the hollow rod has a center channel 425 through which mounting hardware, such as a threaded bolt, runs. This system allows a stronger metallic and/or conducting mounting hardware to connect the clamp bar 234 to the mounting surface 430. FIGS. 4 and 5 illustrate an exemplary bolt head 423 fastening a threaded bolt into the base plate 210 where the base plate 210 has a threaded hole 452. An example of a mounting insulator 424 is a mounting rod. The mounting rod is preferably composed of a material or is at least partially covered with a material where the material is electrically isolating.

The mounting hardware preferably covers a minimal area of the inductor 130 to facilitate cooling with a cooling system 240, such as via one or more fans. In one case, the mounting hardware does not contact the faces 418, 419 of the inductor 130. In another case, the mounting hardware 422 contacts the faces 418, 419 of the inductor 130 with a contact area. Preferably the contact area is less than about 1, 2, 5, or 10 percent of the surface area of the faces 417. The minimal contact area of the mounting hardware with the inductor surface facilitates temperature control and/or cooling of the inductor 130 by allowing airflow to reach the majority of the inductor 130 surface. Preferably, the mounting hardware is temperature resistant to at least 130 degrees Centigrade. Preferably, the mounting hardware comprises curved surfaces along its length to facilitate airflow around the length of the mounting hardware to the faces 418, 419 of the inductor 130.

Still referring to FIGS. 4 and 5, the mounting hardware connects the clamp bar 234, which passes through the inductor 130, to the mounting surface 430. The mounting surface 120 is non-metallic and is rigid or semi-rigid. Generally, the properties of the clamp bar 234 apply to the properties of the mounting surface 430. The mounting surface 430 is optionally (1) composed of the same material as the clamp bar 234 or is (2) a distinct material type from that of the clamp bar 234.

Still referring to FIGS. 4 and 5, in one example the inductor 130 is held in a vertical position by the clamp bar 234, mounting hardware, and mounting surface 430 where the clamp bar 234 contacts the inner surface 414 of the inductor 130 and the mounting surface 430 contacts the outer edge 416 of the inductor 130.

Still referring to FIGS. 4 and 5, in a second example one or more vibration isolators 440 are used in the mounting system. As illustrated, a first vibration isolator 440 is positioned between the clamp bar 234 and the inner surface 414 of the inductor 130 and a second vibration isolator 440 is positioned between the outer edge 416 of the inductor 130 and the mounting surface 430. The vibration isolator 440 is a shock absorber. The vibration isolator 440 deforms under the force or pressure necessary to hold the inductor 130 in a vertical position or edge mounted position using the clamp bar 234, mounting hardware, and mounting surface 430. The vibration isolator 440 preferably is temperature rated to at least 200 degrees Centigrade. Preferably the vibration isolator 440 is about ⅛, ¼, ⅜, or ½ inch in thickness. An example of a vibration isolator 440 is silicon rubber. Optionally, the vibration isolator 440 contains a glass weave 442 for strength. The vibration isolator 440 optionally is internal to the inductor opening 412 or extends out of the inductor 130 central hole 412.

Still referring to FIGS. 4 and 5, a common mounting surface 430 is optionally used as a mount for multiple inductors 130. Alternatively, the mounting surface 430 is connected to a base plate 210. The base plate 210 is optionally used as a base for multiple mounting surfaces 430 connected to multiple inductors 130, such as three inductors 130 used with a poly-phase power system where one inductor 130 handles each phase of the power system. The base plate 210 optionally supports multiple cooling elements, such as one or more cooling elements per inductor 130. The base plate 210 is preferably metal for strength and durability. The system reduces cost associated with the mounting surface 430 as the less expensive base plate 210 is used for controlling relative position of multiple inductors 130 and the amount of mounting surface 430 material is reduced and/or minimized. Further, the contact area ratio of the mounting surface 430 to the inductor surface 416 is preferably minimized, such as to about 1, 2, 4, 6, 8, or 10 percent, to facilitate efficient heat transfer by maximizing the surface area of the inductor 130 available for cooling by the cooling system 240 or by passive cooling.

Still referring to FIGS. 4 and 5, an optional cooling system 240 is used to cool the inductor 130. In one example, a fan blows air about one direction, such as horizontally, through the center hole 412, onto the front face 418, along the inner edge 414 of the inductor 130, and/or along the outer edge 416 of the inductor 130 where the clamp bar 234, vibration isolator 440, mounting hardware, and mounting surface 430 combined contact less than about 1, 2, 5, or 10 percent of the surface area of the inductor 130, which yields efficient cooling of the inductor 130 using minimal cooling elements and associated cooling element power due to a large fraction of the surface area of the inductor 130 being available for cooling.

Mounting hardware may be used on both sides of the inductor 130. Optionally, the inductor 130 mounting hardware is used beside only one face 418, 419 of the inductor 130 and the clamp bar 234 or equivalent presses down or hooks over the inductor 130 through the hole 412 or over the entire inductor 130, such as over the top of the inductor 130.

In yet another embodiment, a section or row of inductors 130 are elevated in a given airflow path. In this layout, a single airflow path or thermal reduction apparatus is used to cool a maximum number of toroid filter inductors 130 in a filter circuit, reducing additional fans or thermal management systems required as well as overall packaging size. This increases the robustness of the filter with fewer moving parts to degrade as well as minimizing cost and packaging size. The elevated layout allows air to cool inductors 130 in the first row and then also cools inductors 130 in an elevated rear row without excessive heating of the air from the front row and with a single airflow path and direction from the thermal management source. Through elevation, a single fan is preferably used to cool a plurality of inductors 130 approximately evenly, where multiple fans would have been needed to achieve the same result. This efficient concept drastically reduces fan count and package size and allows for cooling airflow in a single direction.

An example of an inductor mounting system 400 is provided. Preferably, the pedestal or non-planar base plate 210, on which the inductors 130 are mounted, is made out of any suitable material. In the current embodiment, the pedestal is made out of sheet metal and fixed to a location behind and above the bottom row of inductors 130. Multiple orientations of the pedestal and/or thermal management devices are similarly implemented to achieve these results. In this example, toroid inductors 130 mounted on the pedestal use a silicone rubber shock absorber mounting concept with a bottom plate, base plate, mounting hardware, a center hole clamp bar 234 with insulated metal fasteners or mounting hardware that allows them to be safe for mounting at this elevated height. The mounting concept includes a Glastic® or other non-conductive material of suitable temperature and mechanical integrity as a bottom mounting plate. The toroid sits on a shock absorber of silicone rubber material of suitable temperature and mechanical integrity. In this example, the vibration isolator 440, such as silicone rubber, is about 0.125 inch thick with a woven fiber center 442 to provide mechanical durability to the mounting. The toroid is held in place by a center hole clamp bar 234 of Glastic® or other non-conductive material of suitable temperature and mechanical integrity. The clamp bar 234 fits through the center hole 412 of the toroid and preferably has a minimum of one hole on each end, two total holes, to allow fasteners to fasten the clamp bar to the bottom plate and pedestal or base plate 210. Beneath the center clamp bar 234 is another shock absorbing piece of silicone rubber with the same properties as the bottom shock absorbing rubber. The clamp bar 234 is torqued down on both sides using standard metal fasteners. The fasteners are preferably an insulated non-conductive material of suitable temperature and mechanical integrity. This system allows for the elevated pedestal inductors 130 to be mounted with the center hole 412 parallel to the mounting chassis and allows the maximum surface area of the toroid to be exposed to the moving air; thus maximizing the efficiency of the thermal management system. In addition, this mounting system allows for the two shock absorbing rubber or equivalent materials to both hold the toroid inductor 130 in this upright position. The shock absorbing material also absorbs additional shock and vibration resulting during operation, transportation, or installation so that core 610 material shock and winding 620 shock is minimized.

Inductor Elements

The inductor 130 is further described herein. Preferably, the inductor 130 includes a pressed powder highly permeable and linear core 610 having a BH curve slope of about 11 $\Delta B/\Delta H$ surrounded by windings 620 and an integrated cooling system 240.

Referring now to FIG. 6, the inductor 130 comprises a core 610 and a winding 620. The inductor 130 preferably includes any additional elements or features, such as other items required in manufacturing. The winding 620 is wrapped around core 610. The core 610 provides mechanical support for the winding 620 and is characterized by a permeability for storing a magnetic field in response to current flowing through the winding 620. Herein, permeability is defined in terms of a slope of $\Delta B/\Delta H$. The core 610 and winding 620 are suitably disposed on or in a mount or housing to support the core 610 in any suitable position and/or to conduct heat away from the core 610 and the winding 620.

The inductor core 610 provides mechanical support for the inductor winding and may comprise any suitable core for providing the desired magnetic permeability and/or other characteristics. The configuration and materials of the core 610 may be selected according to any suitable criteria, such as BH curve profiles, permeability, availability, cost, operating characteristics in various environments, ability to withstand various conditions, heat generation, thermal aging, thermal impedance, thermal coefficient of expansion, curie temperature, tensile strength, core losses, and compression strength. For example, the core 610 may configured to exhibit a selected permeability and BH curve. Selecting an appropriate BH curve may allow creation of inductors 130 having smaller components, reduced electromagnetic emissions, reduced core losses, and increased surface area in a given volume compared to inductors using conventional materials, such as laminated silicon steel or conventional silicon iron steel.

The core 610 comprises any suitable core for providing the desired magnetic permeability and other characteristics and is selected according to any suitable criteria. Suitable criteria include: BH curve profiles, permeability, availability, cost, operating characteristics in various environments, ability to withstand various conditions, heat generation, thermal aging, thermal impedance, thermal coefficient of expansion, curie temperature, tensile strength, core losses, and compression strength.

For example, the core 610 is configured to exhibit low core losses under various operating conditions, such as in response to a high frequency pulse width modulation or harmonic ripple, compared to conventional materials. Conventional core materials are laminated silicon steel or conventional silicon iron steel designs. The inventor has determined that the core 610 preferably comprises an iron powder material or multiple materials to provide a specific BH curve, described infra. The specified BH curve allows creation of inductors 130 having: smaller components, reduced emissions, reduced core losses, and increased surface area in a given volume when compared to inductors using the above described traditional materials.

BH Curve

There are two quantities that physicists use to denote magnetic field, B and H. The vector field H is known among electrical engineers as the magnetic field intensity or magnetic field strength also known as auxiliary magnetic field or magnetizing field. The vector field H is a function of applied current. The vector field B is known as magnetic flux density or magnetic induction and has the SI units of Teslas (T). Thus, a BH curve is induction, B, as a function of the magnetic field, H.

Inductor Core

In one exemplary embodiment, the core 610 comprises a pressed powdered iron alloy material. The core 610 includes a distributed gap, which is introduced by the powdered material and one or more bonding agents. Substantially even distribution of the bonding agent within the iron powder of the core 610 results in the equally distributed gap of the core 610. The resultant core loss at the switching frequencies of the electrical switches substantially reduces core losses when compared to silicon iron steel used in conventional iron core inductor design. Further, conventional inductor construction requires gaps in the magnetic path of the steel lamination, which are typically outside the coil construction and are, therefore, unshielded from emitting flux, causing electromagnetic radiation. The electromagnetic radiation can adversely affect the electrical system. The distributed gaps in the magnetic path of the present core 610 material are microscopic and substantially evenly distributed throughout the core 610. The infinitely smaller flux energy at each gap location is also surrounded by a winding 620 which acts as an electromagnetic shield to contain the flux energy. Thus, a pressed powder core 610 surrounded by windings 620 results in substantially reduced electromagnetic emissions.

Figure 7:
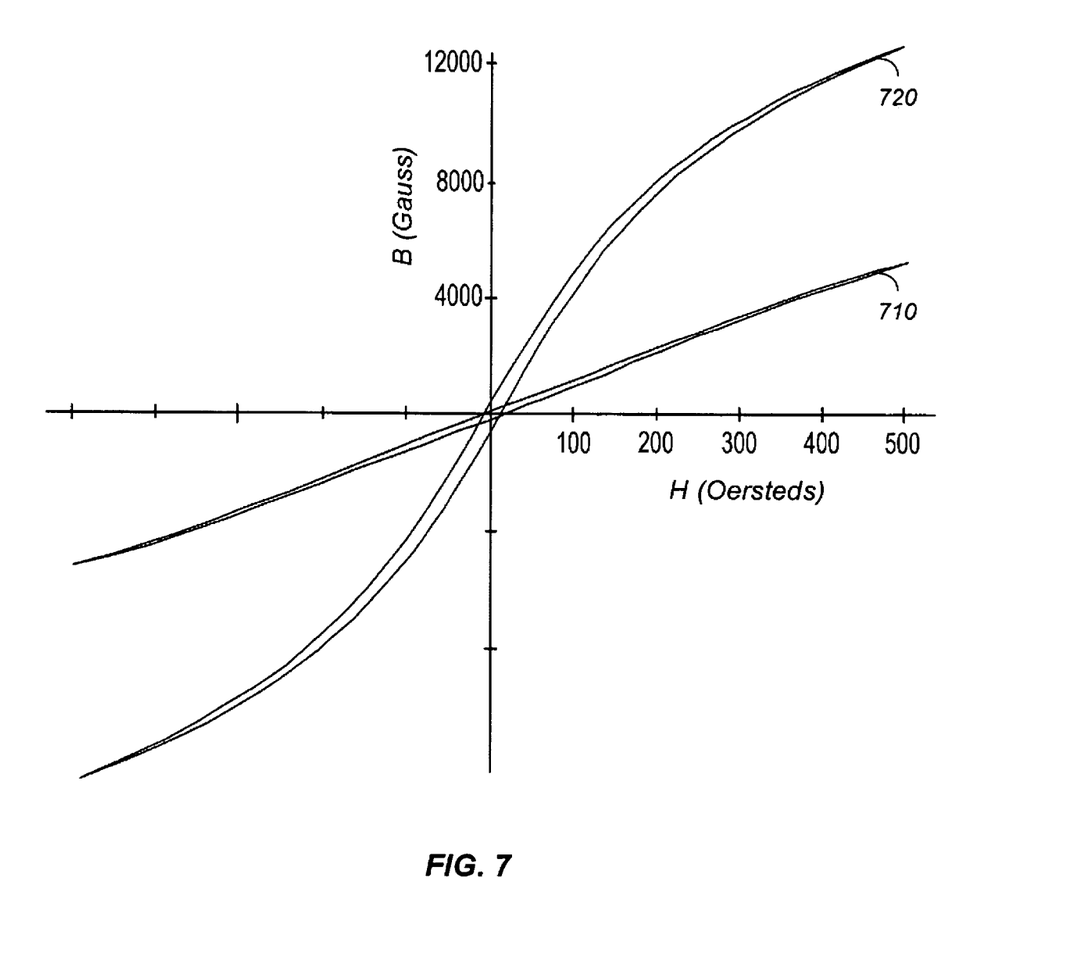
FIG. 7 provides exemplary BH curve results.

Referring now to Table 1, preferred inductance B levels as a function of magnetic force strength are provided. The core 610 material preferably comprises: an inductance of about −4400 to 4400 B with over range of about −400 to 400H with a slope of about 11 $\Delta B/\Delta H$. Herein, permeability refers to the slope of a BH curve and has units of $\Delta B/\Delta H$. Core 610 materials having a substantially linear BH curve with $\Delta B/\Delta H$ in the range of 10 to 12 are usable in a preferred embodiment. Less preferably, core materials having a substantially linear BH curve with a permeability, $\Delta B/\Delta H$, in the range of 9 to 13 are acceptable.

TABLE 1

Typical Permeability 11 BH Response

| B (Tesla/Gauss) | H (Oersted) |
|---|---|
| −4400 | −400 |
| −2200 | −200 |
| −1100 | −100 |
| 1100 | 100 |

TABLE 1-continued

Typical Permeability 11 BH Response

| B (Tesla/Gauss) | H (Oersted) |
|---|---|
| 2200 | 200 |
| 4400 | 400 |

In one embodiment, the core 610 material exhibits a substantially linear flux density response to magnetizing forces over a large range with very low residual flux, Br. The core 610 preferably provides inductance stability over a range of changing potential loads, from low load to full load to overload.

The core 610 is preferably configured in a toroidal shape where the toroid is of any size. The configuration of the core 610 is preferably selected to maximize the inductance rating, $A_L$, of the core 610, enhance heat dissipation, reduce emissions, facilitate winding, and/or reduce residual capacitances.

Capacitor

Capacitors 140 are used with inductors 130 to create a filter to remove harmonic distortion from current and voltage waveforms. A bus bar 260 carries power from one point to another. The capacitor bus bar 260 mounting scheme minimizes space requirements and optimizes packaging. The bus bars 260 integrate with the THISS technology filter output 160 and customer power input 110. This efficient filter output terminal 221, 223, 225 layout minimizes the copper cross section necessary for the capacitor bus bars 260. The copper cross section is minimized for the capacitor bus bar 260 by sending the bulk of the current directly to the output terminals 221, 223, 225. In these circuits, the current carrying capacity of the capacitor bus conductor 260 is a small fraction of the full approximate line frequency load or fundamental frequency current sent to the output load via the output terminals 221, 223, 225. The termination of the THISS technology filter inductor is integrated to the capacitor bank for each phase and to the output termination to the filtered sine wave load. These bus bars 260 may be manufactured out of any suitable material and be any suitable shape. For instance, they may be a flat strip or hollow tube. In the present embodiment flat strips of tinned copper with threaded inserts or tapped threaded holes are used for both mounting the capacitors 140 mechanically as well as providing electrical connection to each capacitor 140. The present embodiment optimizes the packaging efficiency of the capacitors 140 by mounting them vertically and staggering each capacitor 140 from each side of the bus bar 260 for maximum density in the vertical dimension. A common neutral bus bar 265 or flex cable is used between two phases to further reduce copper quantity and minimize size and a jumper bus bar connects this common neutral point to the other phase efficiently using flat strip copper in the present embodiment. Connection fittings designed to reduce radio-frequency interference and power loss may be used. The bus bars 260 may be designed for phase matching and connecting to existing transmission apparatus. The bus bars 260 use a mechanical support spacer, 270, made from non magnetic, non conductive material with adequate thermal and mechanical properties such as Glastic® or Garolite® material or any other suitable epoxy and glass combination. The integrated output terminal bus bars provide for material handling of the filter assembly as well as connection to the sine wave filtered load or motor. Though a 3-phase implementation is displayed, modifications may be made to adapt this integrated method to other power systems.

Referring now to FIG. 8, an additional example of a capacitor bank 800 is provided. In this example, a 3-phase system containing five total bus bars 260 including two common neutral bus bars 265 is provided. The illustrated system contains seven columns and three rows of capacitors 140 per phase or twenty-one capacitors 140 per phase for each of three phases, U1, V1, W1. Spacers maintain separation of the component capacitors 140. The shared neutral point 207 illustrates two phases sharing a single shared neutral bus 265.

In still yet another embodiment, the inductor 130 is preferably in direct contact with a coolant, such as immersed in a non-conductive liquid coolant. The coolant absorbs heat energy from the toroid shaped inductor 130 and preferably removes the heat to a heat exchanger. The heat exchanger radiates the heat outside of the sealed inductor enclosure. The process of heat removal transfer allows the inductor 130 to maintain a steady state temperature under load.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. While single PWM frequency, single voltage, single power modules, in differing orientations and configurations have been discussed, adaptations and multiple frequencies, voltages, and modules may be implemented in accordance with various aspects of the present invention. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. An apparatus for filtering multi-phase power, comprising:
   a base plate having a mounting surface;
   an inductor comprising an outside surface and two faces, said outside surface mounted about parallel to said mounting surface;
   an array of capacitors, said array comprising a first capacitor and a second capacitor;
   said first capacitor, comprising:
       a first outer surface comprising a first point closest to said mounting surface;
       a first distance from said first point to said mounting surface; and
       a first diameter;
   said second capacitor, comprising:
       a second outer surface comprising a second point closest to said mounting surface;
       a second distance from said second point to said mounting surface, wherein said first distance is less than said second distance, and wherein said first distance plus two times said first diameter is greater than said second distance.

2. The apparatus of claim 1, further comprising running said multi-phase power through said inductor and said array of capacitors to produce a filtered output power.

3. The apparatus of claim 1, wherein said inductor includes a center opening and comprises a surface area encompassing all of: a front face, a back face, an inner surface about said center opening, and an outer edge concentric about said center opening; and the apparatus gurther comprises an inductor mount configured to mount said inductor to said mounting surface, wherein the inductor mount comprises:
   mounting hardware holding said outer edge of said inductor to the mounting surface; and
   a cooling element, wherein said cooling element moves air: into contact with said front face, through said center opening, and around said outer edge of said inductor, wherein said mounting hardware contacts less than ten percent of said surface area of said inductor.

4. The apparatus of claim 3 wherein said mounting hardware comprises a clamp element running through said center opening of said inductor, wherein said clamp element comprises a non-conducting material.

5. The apparatus of claim 3, wherein said inductor comprises a substantially annular core, wherein said substantially annular core comprises a mass of a core material, said core material comprising an equally distributed gap at a particulate scale throughout said mass of said substantially annular core, said inductor further comprising:
   a conductor wound about said substantially annular core, wherein said inductor operates at current levels in excess of about one hundred amperes,
   wherein said inductor exhibits a permeability of less than thirteen delta Gauss per delta Oersted at a load of four hundred Oersteds, wherein, during use, a period of alternating current flowing through said inductor is present at greater than about five hundred Hertz.

6. The apparatus of claim 1 wherein said inductor further comprises:
   a toroidal core comprising a first core material, wherein the first core material:
       defines a distributed gap;
       comprises a magnetic field of less than four thousand Gauss at two hundred Oersteds; and exhibits low permeability and low core losses at frequencies above 500 Hz; and a winding, comprising:
           a first terminal and a second terminal; and multiple strands of wire wrapped around the core, wherein each of at least two of the multiple strands of wire connect in parallel the first terminal and the second terminal.

7. The apparatus of claim 6, wherein the first core material comprises a pressed powdered iron alloy.

8. The apparatus of claim 6, wherein the winding comprises substantially round insulated copper wire.

9. The apparatus of claim 1, wherein said array comprises an m by n matrix of capacitors,
   wherein m comprises a first dimension about perpendicular to said mounting surface,
   wherein n comprises a second dimension about parallel to said mounting surface,
   wherein said array comprises at least three capacitors in said m dimension, and
   wherein said array comprises at least two capacitors in said n dimension.

10. An apparatus of claim 1, wherein said array of capacitors comprises:
   a plurality of capacitors distributed in three dimensions in an array, said array comprising:
       a first row of said capacitors carrying a first phase of said multi-phase power;
       a second row of said capacitors carrying a second phase of said multi-phase power;
       a common neutral bus bar running between said first row and said second row;
       at least two capacitors mounted with enclosing sides running in parallel along an axis parallel to said mounting surface; and
       at least two capacitors mounted with enclosing sides running in parallel along an axis about perpendicular to said mounting surface.

11. The apparatus of claim 10, further comprising running said multi-phase power through said inductor and said array of capacitors to produce a filtered output power.

12. The apparatus of claim 10, wherein said inductor includes a center opening and wherein said inductor comprises a surface area encompassing all of: a front face, a back face, an inner surface about said center opening, and an outer edge concentric about said center opening: further comprising an inductor mount configured to mount said inductor to said mounting surface, wherein the inductor mount comprises:

mounting hardware holding said outer edge of said inductor to the mounting surface; and a cooling element, wherein said cooling element moves air: into contact with said front face, through said center opening, and around said outer edge of said inductor, wherein said mounting hardware contacts less than ten percent of said surface area of said inductor.

13. The apparatus of claim 12 wherein said mounting hardware comprises a clamp element running through said center opening of said inductor, wherein said clamp element comprises a non-conducting material.

14. The apparatus of claim 12, wherein said inductor comprises a substantially annular core, wherein said substantially annular core comprises a mass of a core material, said core material comprising an equally distributed gap at a particulate scale throughout said mass of said substantially annular core, said inductor further comprising:

a conductor wound about said substantially annular core, wherein said inductor operates at current levels in excess of about one hundred amperes, wherein said inductor exhibits a permeability of less than thirteen delta Gauss per delta Oersted at a load of four hundred Oersteds, wherein, during use, a period of alternating current flowing through said inductor is present at greater than about five hundred Hertz.

15. The apparatus of claim 10, wherein said inductor further comprises:

a toroidal core comprising a first core material, wherein the first core material:
defines a distributed gap;
comprises a magnetic field of less than four thousand Gauss at two hundred Oersteds; and exhibits low permeability and low core losses at frequencies above 500 Hz; and a winding, comprising:
a first terminal and a second terminal, and multiple strands of wire wrapped around the core, wherein each of at least two of the multiple strands of wire connect in parallel the first terminal and the second terminal.

16. The apparatus of claim 15, wherein said first core material further comprises a pressed powdered iron alloy.

17. The apparatus of claim 15, wherein said winding further comprises substantially round insulated copper wire.

18. The apparatus of claim 10, wherein said array comprises an m by n matrix of capacitors, wherein m comprises a first dimension about perpendicular to said mounting surface, wherein n comprises a second dimension about parallel to said mounting surface, wherein said array comprises at least three capacitors in said m dimension, and wherein said array comprises at least two capacitors in said n dimension.

19. The apparatus of claim 10, wherein said at least two capacitors—in axis perpendicular are staggered as defined in by distance from mounting surface to bottom or closest point of second closest capacitor; is less than distance to top or furthest point on body of closest capacitor in array.

* * * * *

UNITED STATES PATENT AND TRADEMARK OFFICE
CERTIFICATE OF CORRECTION

PATENT NO. : 7,973,632 B2  
APPLICATION NO. : 12/434894  
DATED : July 5, 2011  
INVENTOR(S) : MacLennan et al.

It is certified that error appears in the above-identified patent and that said Letters Patent is hereby corrected as shown below:

In column 15, claim 3, line 50, please delete "gurther" and insert --further--

Signed and Sealed this
Thirteenth Day of September, 2011

David J. Kappos
*Director of the United States Patent and Trademark Office*